May 6, 1924.
H. F. BLACKWELL
TRACTOR ATTACHMENT FOR AUTOMOBILES
Filed Feb. 19, 1919
1,493,239
3 Sheets—Sheet 1
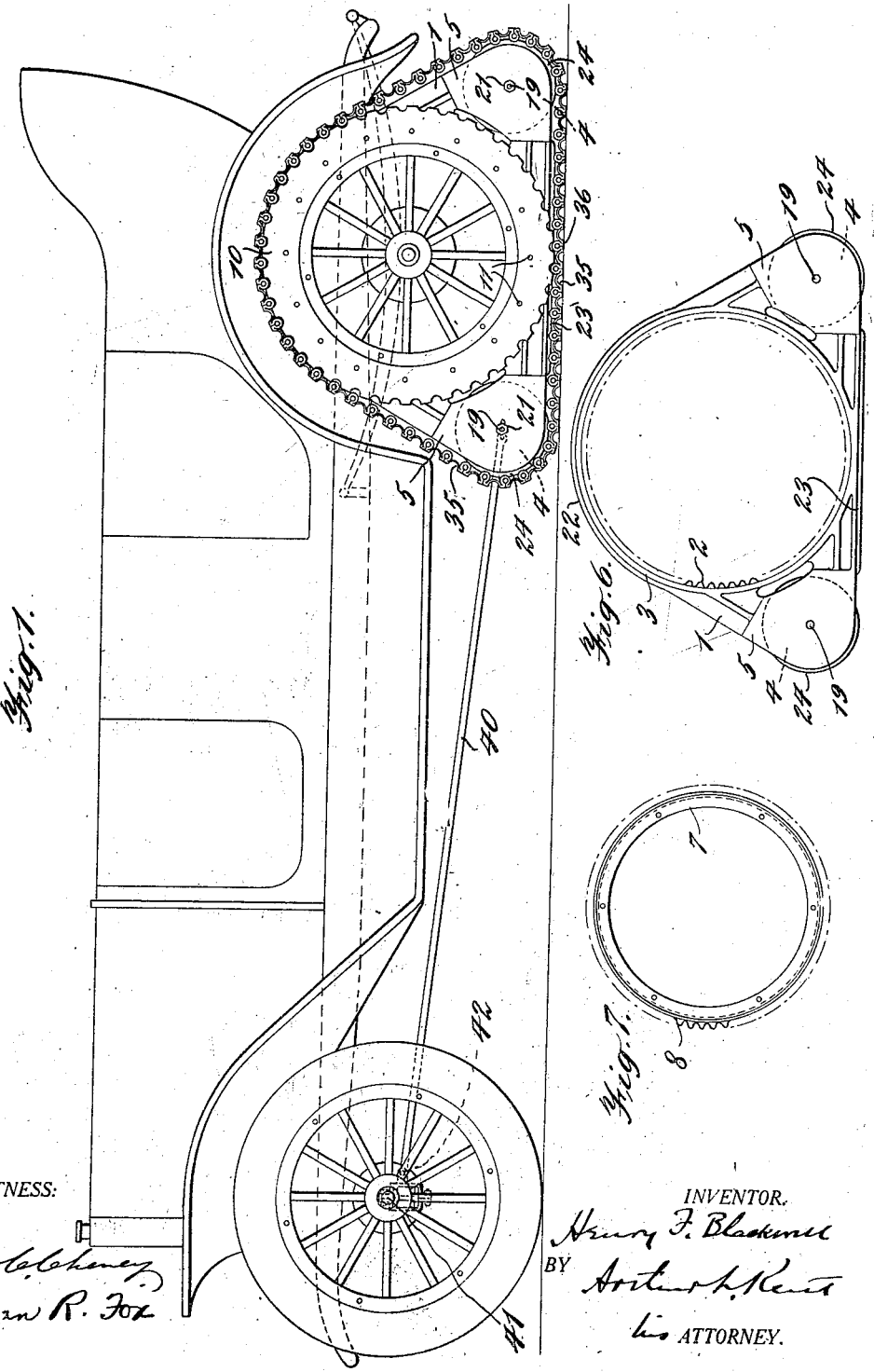
WITNESS:
INVENTOR.
Henry F. Blackwell
BY
his ATTORNEY.

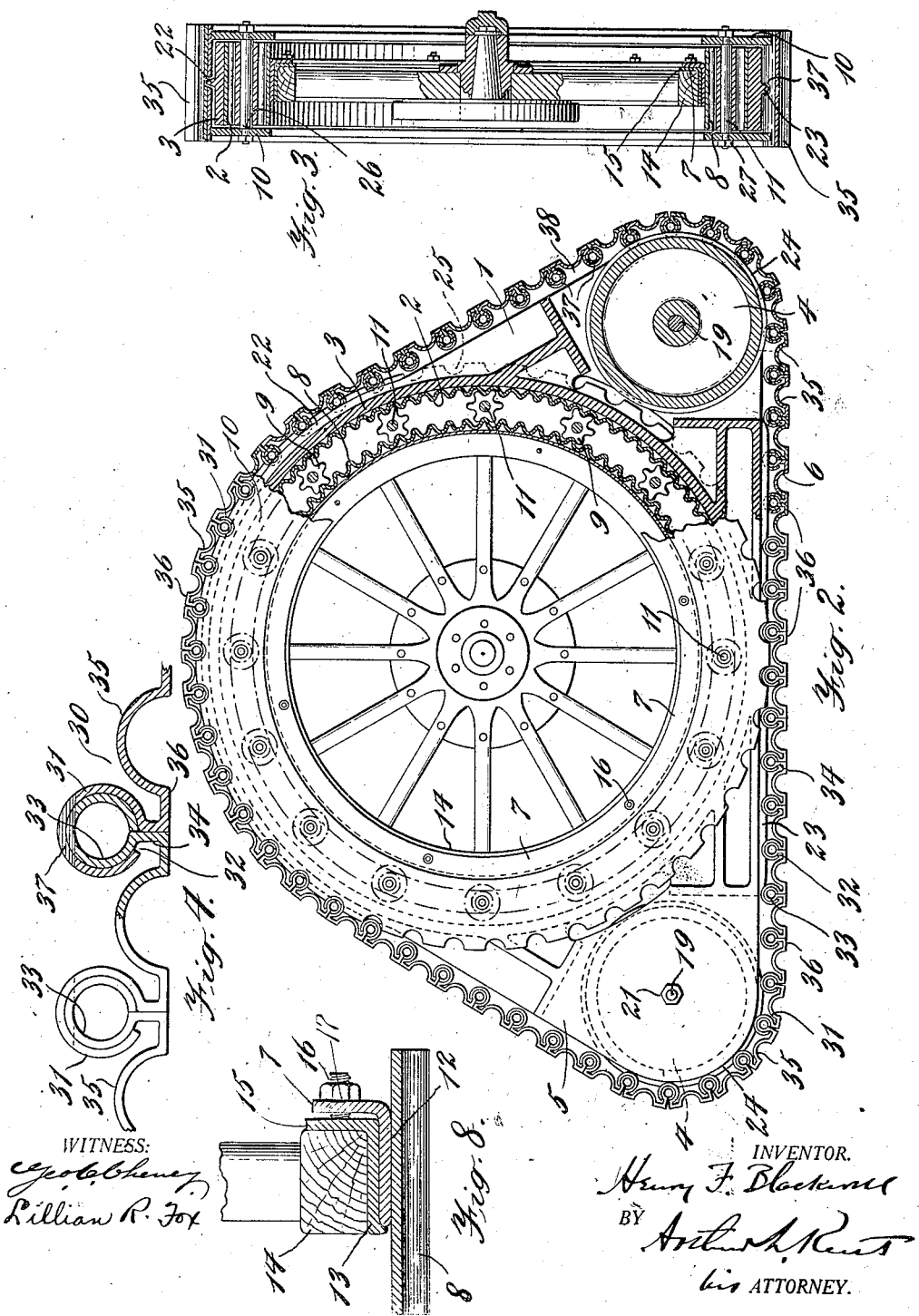

May 6, 1924.
H. F. BLACKWELL
TRACTOR ATTACHMENT FOR AUTOMOBILES
Filed Feb. 19, 1919
1,493,239
3 Sheets-Sheet 3
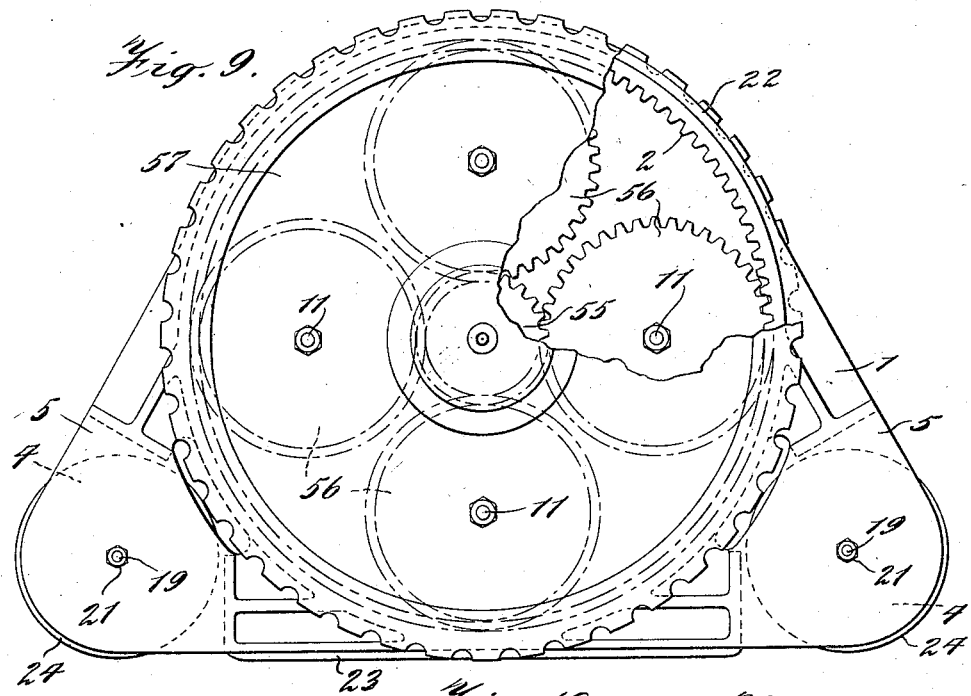
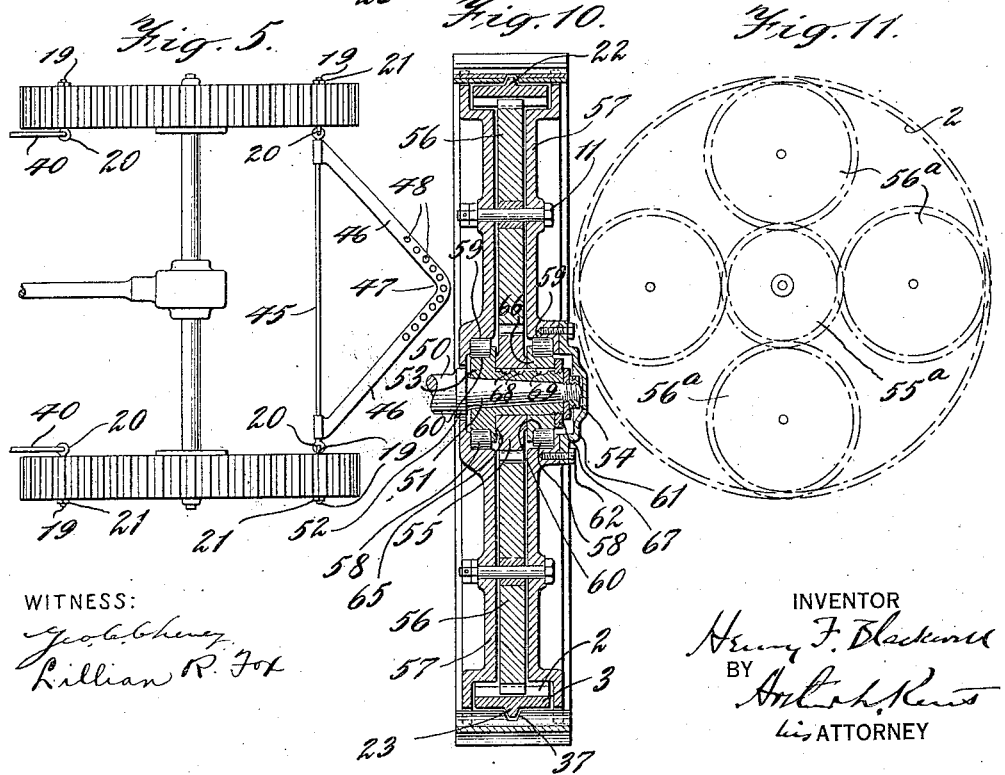
WITNESS:
INVENTOR
BY
ATTORNEY Patented May 6, 1924.

1,493,239

UNITED STATES PATENT OFFICE.

HENRY F. BLACKWELL, OF HIGHLAND, NEW YORK.

TRACTOR ATTACHMENT FOR AUTOMOBILES.

Application filed February 19, 1919. Serial No. 278,030.

*To all whom it may concern:*

Be it known that I, HENRY F. BLACKWELL, a citizen of the United States, residing at Highland, in the county of Ulster, and State of New York, have invented certain new and useful Improvements in Tractor Attachments for Automobiles, fully described and represented in the following specification and the accompanying drawings, forming a part of the same.

The principal object of the invention is to provide quickly- and easily-attachable means for increasing the tractive ground contact of a motor vehicle to enable it to be used satisfactorily in deep snow and as a tractor for heavy pulling over soft ground, and for other purposes. Other objects are to increase the normal power leverage of the vehicle by simple means; to provide attaching devices which cooperate with ordinary axle-and-hub, or demountable-rim structures; and to improve and simplify certain features of belt tractor structure regardless of the object of quickly attaching and detaching the traction means.

These and other objects are realized in the physical embodiments of the invention shown in the accompanying drawings. After considering these embodiments in connection with the following description, it will be evident to persons skilled in the art that the invention may be embodied in other forms, and I do not limit myself to details except as claimed.

Fig. 1 is a side elevation of an automobile provided with my tractor mechanism demountably attached to the rear wheel.

Fig. 2 is an enlarged view, mainly in side elevation, but partly in section, of one of the tractor units in position on a wheel.

Fig. 3 is a vertical transverse section at the center of Fig. 2.

Fig. 4 is a detail, partly in side elevation and partly in section, of part of the tractor belt.

Fig. 5 is a top plan view, on a reduced scale, of the rear axle of a vehicle with one of the tractor units applied to each wheel, showing particularly certain brace-rod connections, and also one form of draft-connection.

Fig. 6 is a side elevation of one of the tractor frames.

Fig. 7 is a side elevation of one of the demountable-rim structures.

Fig. 8 is an enlarged sectional detail of the demountable-rim structure.

Fig. 9 is a side elevation of a tractor unit adapted to be secured detachably to the vehicle axle, some parts being shown in section, and the belt being omitted.

Fig. 10 is a vertical section of the same.

Fig. 11 is a diagrammatic side elevation of modified gearing adaptable to the form of the invention shown in Figs. 9 and 10.

Each of the tractor attachments comprises, in the structure shown in Figs. 1 to 8 inclusive, a frame 1, an internal gear 2 located in a circular ring 3 of the frame, idlers 4 located in housings 5 of the frame, an articulated traction chain or belt 6, a demountable-rim structure 7 carrying an external gear 8, pinions 9, each of which engages gears 2 and 8, and flat rings 10 which may be identified as sprocket plates, having a driving engagement with the belt, and connected to the extended ends of the pinion shafts 11. The detachable rim structure shown by itself in Fig. 7 in one convenient form comprises a ring or rim 12 which is designed to properly fit the rim 13 which is usually permanently secured to the wheel felly 14 to receive the demountable rim as is usual in automobile demountable-rim construction. The rim 13 has inwardly turned ears or a flange 15, as shown in the drawing, apertured to receive the stud screws to which the demountable rim structure 7 is attached by nuts 17 in the same way as an ordinary demountable rim. The external gear 8, in a preferred construction, is formed by crimping or bending a flat strip of steel into the form of gear teeth and at the same time bending it into the form of a ring. This may be done, for example, by rolling the strip into the teeth of a properly constructed die or master gear to give the proper form to the teeth of the gear ring 8. The external gear so formed is secured to the cylindrical portion 12 of the demountable rim structure 7 by spot, or autogenous, welding, or otherwise.

The frame 1 may be formed as a single steel casting or built up of pressed or structural shapes. The internal gear 2 may be formed in the same manner as explained with reference to gear 8 and secured in the stationary ring 3 of the frame in the same manner.

The idlers 4 are supported in housings 5 upon shafts 19. Each of these shafts may be in the general form of an eyebolt with the eye 20 located at the inner side of the tractor unit when in position. The outer ends of these bolts are screw threaded and secured by nuts 21. Substantially in the central vertical plane of the unit the frame is provided with shallow flanges 22 and 23 located about the upper part of ring 3 and at the bottom of the frame respectively, and each of the idlers is provided with a flange 24 in line with flanges 22 and 23. These flanges engage and guide the belt as will appear later.

One of the sprocket rings 10 is placed at each side of the rim and frame structure. In the outer edge of each ring are formed sockets 25 for driving engagement with the belt. The rings are secured together by the pinion shafts 11 which have shoulders 26 abutting against the inner faces of the rings to properly space them. The rings are held against the shoulders by nuts 27.

Each of the pinion shafts 11 carries one of the pinions 9 as previously mentioned, and these pinions are arranged in an annular series, as shown in Fig. 2, between gears 2 and 8, so that they support the revoluble rim structure 7 within the stationary ring 3 of the frame and provide means for driving the sprocket rings 10, when the wheel is driven in either direction, at a reduced speed with correspondingly increased power, the ratio of reduction as between the wheel and the sprocket rings being approximately two to one.

The belt 6 may vary considerably in its construction, but in a preferred form as shown, it comprises a plurality of independent plates or links 30. Each of these links may be formed from a single piece of metal, usually by bending or pressing. Each link preferably has at one end a tubular portion 31 which is left open at 32, and at the other end has a tubular portion 33 which may be entirely closed. The tubular member 33 of each link may be inserted endwise into the tubular portion 31 of the next adjacent link, as shown in Fig. 4, the shank 34 of the one member being accommodated and permitted the necessary movement in the bending of the belt by the slot or opening 32 of the other member. Conveniently, to afford increased traction and to stiffen the link it may be provided with a central transverse crimp or bend 35. This leaves at each end of each link on the tread a flat area 36. When the belt is straight, as in the ground contact portion, Fig. 2, the flat surfaces 36 of adjacent links lie together and afford sufficient bearing surface for hard ground or snow, but evidently when softer snow or earth is encountered the tread surfaces will sink in deeper and the contact area and tractive grip of the belt will be increased by the engagement of the curved portions 35. Substantially at the center, the cylindrical parts 31 and 33 of the links are slotted longitudinally of the belt as at 37. These slots when the belt is assembled and put in position about the frame, as shown in Fig. 2, engage the flanges 22 and 23 of the frame and 24 of the idlers and not only keep the belt in line properly upon the frame, but prevent lateral dislocation of the individual links. The belt may be disconnected or any worn or broken link may be replaced by driving out the link laterally at a point such as 38, Fig. 2, where there is no flange in engagement with the belt. When the belt is in position the outer cylindrical members 31 afford a driving connection for the belt by engaging the sockets 25 of the sprocket rings 10.

A complete unit, as described, can be easily and quickly applied to each driving wheel of an automobile after the demountable tire rim has been removed by placing the rim 12 in position, as shown in Fig. 8, and screwing up the nuts 17. This act of attachment puts the tractor unit in readiness for operation since any movement of the vehicle wheel causes the external gear 8 to roll upon and drive the pinions 9 and these in turn roll upon the fixed internal gear 2 in the corresponding direction and the pinion shafts and sprocket plates 10 are thus driven in the same direction at a speed slightly less than one-half that of the vehicle wheel, imparting a correspondingly powerful movement to the belt.

Preferably, in many cases, it is desirable to provide means for taking up the driving reaction and for relieving the vehicle axle from strains caused by the traction devices. To take up driving reaction, radius rods or struts 40 may be provided connected at their rear ends to the eyes 20 of the forward idler shafts 19, and at their forward ends to a suitable part of the vehicle such as the frame, or, as shown in Fig. 1, to the front axle 41 by means of fittings 42 secured to the axle. Strains upon the axle which would be caused by lateral twisting of the tractor units may be prevented by a transverse strut or rod 45 connected at each end to one of the eyes 20 of the rear idler shafts 19, as shown in Fig. 5.

A quickly attachable belt-carrying unit of similar construction may conveniently be applied to each front wheel of a vehicle, and in the case of four-wheel-drive trucks such units would include the driving mechanism as well as the belt supporting mechanism; but in cases where the front vehicle wheels are used only for steering, the driving means of the tractor unit could in that case be dispensed with. For instance, in that case the gears 2 and 8 could be replaced by smooth surfaces having a rolling contact with rollers in lieu of the pinions 9.

It is desirable in many cases to provide draft means attached to the tractor units to simplify the attachment of the parts to the motor vehicle and to apply the draft load to the tractor devices rather than to the vehicle proper. One arrangement of this purpose is shown in Fig. 5 in which an approximately V-shaped rail or bar 46 is connected at each end to one of the eyebolts or rear idler shafts 19, and conveniently this draft rail may form a unit with the cross brace rod 45 above described. A shiftable or travelling draft link in the general form of a clevis (not shown) with a pin or roller engaging the forward edge of the draft rail 46 may be provided, and in that case the pull of the load will tend to center the draft appliance at the apex 47 of the rail. Or in some cases the draft rail may be provided with a series of holes 48 for insertion of the coupling pin at any desired point for the adjustment of the draft load as may be necessary.

The structure above described includes one method of securing the tractor unit to the axle structure of a motor vehicle, and more particularly to the axle drive shaft, the connection in that form of the invention being through the vehicle wheel. In some cases it is desired to connect the tractor unit more directly to the axle structure and especially to the axle drive shaft. An organization of parts for that purpose is shown in Figs. 9, 10 and 11 in which the axle drive shaft 50 of the vehicle is provided with a tapered portion 51 and shoulder 52 to receive a quickly detachable hub 53 forming a part of the demountable tractor unit. This hub is connected with the other parts of the tractor unit in such a way, as will appear, that by placing the hub on the axle member 51 and securing it against the shoulder 52 by a nut 54 or other suitable locking means the entire unit is operatively attached to the vehicle. The hub sleeve carries a driving pinion 55 engaging with planetary gears 56, which take the place of the pinions 9 of the previously described structure. The number of these gears 56 may be varied, but they are conveniently four in number, and they engage at their outer sides with the internal gear 2 of the frame as in the other structure. The axle pinion 55 may be made of different sizes, but the present construction is conveniently devised, so that by making the axle pinion 55 relatively small and the planetary gears 56 relatively large the ratio of drive reduction may be increased very materially as compared with the tractor of Figs. 1 to 8. The gears 56 run on shafts 11 and these shafts are extended and connected to sprocket plates 57 which are operatively similar to the sprocket plates 10 previously described, but in this construction are extended further inward to cover the gearing, and in a preferred construction, may be extended to substantially meet the hub, where the sprocket plates and the hub may be provided with cooperating means to exclude dirt, or, otherwise, as shown in Fig. 10, bearings may be provided between the hub and the sprocket plates. When such bearings are provided they support the load of the vehicle and take the load off of the contact points between the teeth of the gears 55, 56 and 2. A desirable form of bearing comprises anti-friction rollers 58 running in races 59 and 60 carried by the sprocket plates and hub respectively. A hub cap 61 may be provided, secured to a suitably formed part of the outer sprocket plate 57 by screws 62, or otherwise. This completes the enclosure of the outside of the tractor unit, but may be easily removed to give access to the nut 54 for attaching and detaching the unit.

Fig. 11 is a diagram of gearing showing that the reduction ratio in either form of the invention may be varied considerably by changing the relative diameters of the center gear or pinion and the planet pinions. The central gear 55$^a$ is made of a size intermediate between that of the pinion 55 of Figs. 9 and 10 and that of gear 8 of Fig. 2, and the planet gears or pinions 56$^a$ are of proper sizes to connect the central gear with the internal gear 2. To facilitate changing the gear ratio, or for easily removing and replacing the central pinion 55 for any reason, it may be made detachable, as shown in Fig. 10. The gear 55 is slipped over the hub sleeve 53 until it rests against hub flange 65, which carries bearing race 60. The ring 66 carrying the outer bearing race 60 is then put in position against the gear and the gear and ring 66 are locked in position by nut 67. Suitable keys 68, 69, or other suitable devices, are provided to form a rotary connection with the hub sleeve.

What is claimed is:

1. A tractor attachment for motor vehicles, comprising a flexible traction belt, means for maintaining an extensive part of the belt normally in contact with the ground, means for quickly securing the attachment as a unit to a vehicle by fastening it to a wheel of the demountable-rim type by the means provided for fastening a rim to such wheel, and means for driving the belt by the movement of the vehicle wheel.

2. A tractor attachment for motor vehicles, comprising a flexible traction belt, means for maintaining an extensive part of the belt normally in contact with the ground, means for quickly securing the attachment as a unit to a vehicle by fastening it to a wheel of the demountable-rim type by the means provided for fastening a rim to such wheel, and means for driving the belt by the movement of the vehicle wheel at a reduced speed in relation to that of the wheel.

3. A tractor unit for motor vehicles, comprising a frame, a tractor belt, means for movably supporting the belt upon the frame with an extensive part of its surface normally in engagement with the ground, driving means for the belt, and means for quickly attaching the unit to a wheel of the vehicle by clamping a member of the unit operatively connected with said driving means, to the wheel rim of a driving wheel of the vehicle.

4. A tractor unit for motor vehicles, comprising a frame, a traction belt movably carried by the frame, a ring adapted to be quickly secured to the rim of the vehicle wheel and quickly disconnected, and means intermediate said ring and the belt for driving the latter.

5. A tractor unit for motor vehicles, comprising a frame, a traction belt movably carried by the frame, a ring adapted to be quickly secured to the rim of the vehicle wheel and quickly disconnected, and means intermediate said ring and the belt for driving the latter, said means including reduction gearing.

6. A tractor unit for motor vehicles, comprising a frame, an internal gear therein, a member adapted to be clamped to the rim of a vehicle wheel, a gear thereon, pinions engaging both of said gears, a driving member connected to the axes of said pinions, and a belt movably supported by said frame and driven by said member.

7. A tractor unit for motor vehicles, comprising a frame, an internal gear therein, idlers carried by frame extensions near the bottom, a rim structure comprising means for securing it to the rim of a vehicle wheel and a gear, pinions located between said gears and engaging both of them, a sprocket plate connected to the axes of said pinions, a belt passing about said frame and idlers, and means on said sprocket plate and the belt affording a driving connection.

8. In belt tractor mechanism for motor vehicles, the combination of a separate tractor unit secured to each driving wheel of the vehicle, each unit comprising a traction belt and means for driving it by movement of the vehicle wheel, and a rigid transverse strut independent of the vehicle chassis between said tractor units pivotally connected to each of said units to take up lateral or twisting strains while permitting relative up and down movement of the units.

9. In belt tractor mechanism for motor vehicles, the combination of a separate tractor unit secured to each driving wheel of the vehicle, each unit comprising a traction belt and means for driving it by movement of the vehicle wheel, a rigid strut extending from each of said units to a forward part of the vehicle, and a transverse strut independent of the vehicle chassis between said tractor units pivotally connected to each of said units to take up lateral or twisting strains.

10. In belt tractor mechanism for motor vehicles, the combination of a separate tractor unit secured to each driving wheel of the vehicle, each unit comprising a traction belt and means for driving it by movement of the vehicle wheel, a triangular frame between said units pivotally connected to each of them and forming a transverse brace and a draft bar.

In testimony whereof I have hereunto set my hand in the presence of two subscribing witnesses.

HENRY F. BLACKWELL.

Witnesses:
 CHAS L. DU BOIS,
 ARTHUR P. MERRITT.